United States Patent [19]

Wada et al.

[11] 4,247,872
[45] Jan. 27, 1981

[54] FACSIMILE SIGNAL CONVERTER

[75] Inventors: Tasaku Wada, Naritanishi; Tohru Asami; Kouzou Nakao, both of Hoya, all of Japan

[73] Assignee: Kokusai Denshin Denwa Kabushiki Kaisha, Tokyo, Japan

[21] Appl. No.: 29,130

[22] Filed: Apr. 11, 1979

Related U.S. Application Data

[63] Continuation-in-part of Ser. No. 875,759, Feb. 7, 1978, abandoned.

Foreign Application Priority Data

Feb. 7, 1977 [JP] Japan .................................. 52/12278

[51] Int. Cl.³ ............................................. H04N 1/40
[52] U.S. Cl. .................................... 358/256; 358/280; 358/285; 358/301; 360/101
[58] Field of Search .............. 358/280, 285, 293, 296, 358/301, 256; 360/101, 48, 52

[56] References Cited

U.S. PATENT DOCUMENTS

| | | | |
|---|---|---|---|
| 3,708,050 | 1/1973 | McCarthy | 400/124 |
| 4,009,332 | 2/1977 | Van Hook | 358/280 |
| 4,025,957 | 5/1977 | Wada | 360/48 |
| 4,134,135 | 1/1979 | Inokuchi | 358/280 |
| 4,136,261 | 1/1979 | Wada | 358/301 |

Primary Examiner—Howard W. Britton
Attorney, Agent, or Firm—Robert E. Burns; Emmanuel J. Lobato; Bruce L. Adams

[57] ABSTRACT

A facsimile signal converter for mutually converting to each other one of a facsimile signal of one-way scanning and a facsimile signal of two-way scanning for each scanning line, in which a first read head and a second read head are reciprocated for scanning in opposite directions along two spaced but parallel travel paths, respectively, while a write head travels together with the first read head along a travel path developed at the midway between the two travel paths and to be positioned on the same line perpendicular to each of the two parallel travel lines. A recording medium is shifted by a certain length in a direction perpendicular to the travel paths for each scanning of the first read head and the second read head. In case of using an endless recording medium, it is alternately shifted by a first length and a second length twice the first length. Each of the certain length and the first length is equal to half the space between the two travel paths.

5 Claims, 20 Drawing Figures

FACSIMILE SIGNAL CONVERTER

CROSS-REFERENCE TO RELATED APPLICATION

This application is a continuation-in-part of our co-pending application, Ser. No. 875,759, filed on Feb. 7, 1978 and now abandoned.

BACKGROUND OF THE INVENTION

1. Field of the Invention

This invention relates to a facsimile signal converter for mutually converting to each other a facsimile signal of one-way scanning and a facsimile signal of two-way scanning for each scanning line.

2. Description Of The Prior Art

Mainly, scanning in conventional facsimile apparatus is a one-way scanning. Recently, a facsimile apparatus characterized by a two-way scanning has been developed as proposed in U.S. Pat. No. 4,025,957. Then, for the communication between the one-way scanner and the two-way scanner, signal conversion is needed for each scanning line. However, no satisfactory device for such signal conversion has been proposed yet.

SUMMARY OF THE INVENTION

An object of this invention is to provide a simple-structured, small facsimile signal converter for converting to each other a facsimile signal of one-way scanning and a facsimile signal of two-way scanning for each scanning line.

To attain the above object of this invention, there is proposed a facsimile signal converter for mutually converting to each other one of a facsimile signal of one-way scanning and a facsimile signal of two-way scanning for each scanning line, in which a first read head and a second read head are reciprocated for scanning in opposite directions along two spaced but parallel travel paths, respectively, while a write head travels together with the first read head along a travel path developed at the midway between the two travel paths and to be positioned on the same line perpendicular to each of the two parallel travel lines. A recording medium is shifted by a certain length in a direction perpendicular to the travel paths for each scanning of the first read head and the second read head. In case of using an endless recording medium, it is alternately shifted by a first length and a second length twice the first length. Each of the certain length and the first length is equal to half the space between the two travel paths.

BRIEF DESCRIPTION OF THE DRAWINGS

The principle, construction and operation of this invention will be clearly understood from the following detailed description taken in conjunction with the accompanying drawings, in which.

DESCRIPTION OF THE PREFERRED EMBODIMENTS

Figure 1:
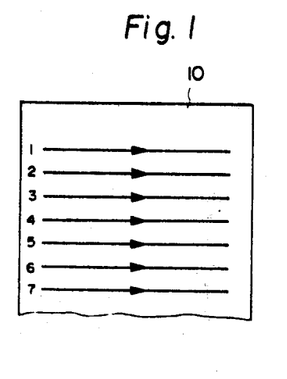
FIG. 1 is a diagram explanatory of a one-way scanning operation.
Figure 2:
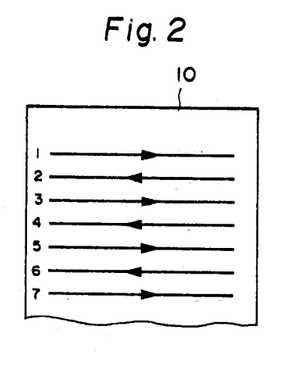
FIG. 2 is a diagram explanatory of a two-way scanning operation.

FIGS. 1 and 2 respectively illustrate one-way scanning and two-way scanning in facsimile, FIG. 1 showing the one-way scanning from left to right on a recording medium 10 and FIG. 2 the two-way scanning in which odd-numbered scanning lines run from left to right and even-numbered scanning lines from right to left.

Figure 3:
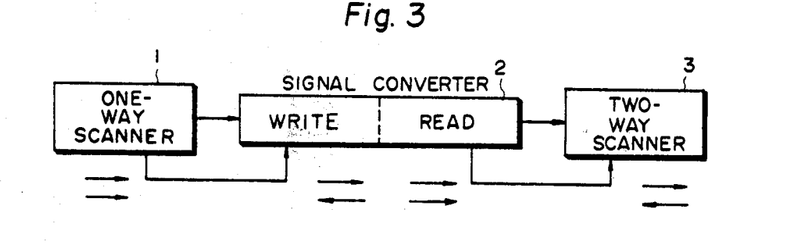
FIG. 3 is a block diagram illustrating a signal path from a one-way scanner via a converter.
Figure 4:
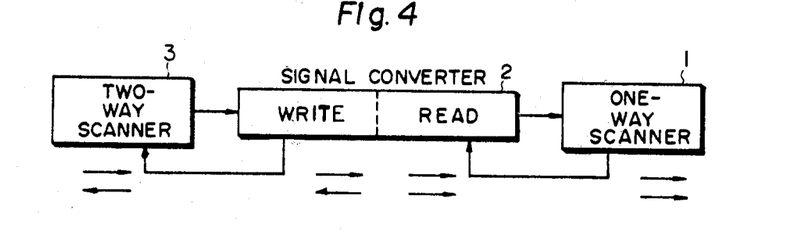
FIG. 4 is a block diagram illustrating a signal path reverse in direction to that shown in FIG. 3.

FIGS. 3 and 4 respectively show a signal path from a one-way scanner 1 to a two-way scanner 3 via a signal converter 2 of this invention and a signal path in the opposite direction. A signal from the one-way scanner 1 is written by a write head of the signal converter 2 and is read out from the signal converter by a read head and sent to the two-way scanner 3. In FIG. 4, a signal is transmitted and received in the signal path opposite in direction to the above. In either case, the one-way scanner 1 controls the other device. The reason is that after the one-way scanner 1 has once started, it operates at a constant speed and is incapable of having its speed controlled by other devices. However, the two-way scanner 3 and the signal converter 2 adopts a start-stop synchronization system which enables speed control by other devices. The arrows under each device indicate the scanning directions of the scanning signal of adjacent two scanning lines.

Figure 5:
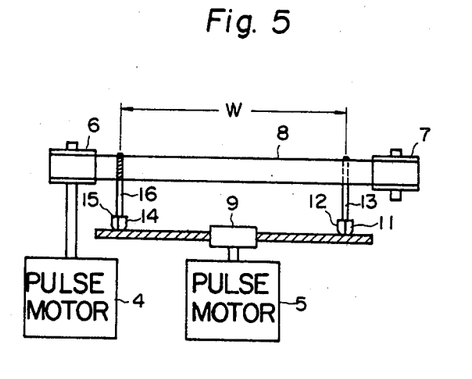
FIGS. 5 and 6 are a front view and a plan view jointly illustrating an embodiment of this invention.
Figure 6:
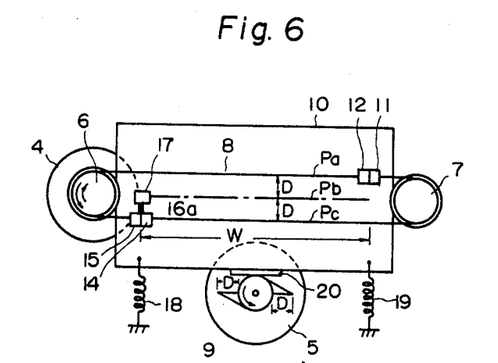

FIGS. 5 and 6 are respectively a front view and a plan view jointly illustrating an embodiment of the facsimile signal converter of this invention. As shown, metal fixtures 13 and 16 are set at one end to a belt 8 stretched between pulleys 6 and 7, and a second read head 11 and an erase head 12 are mounted on the free end of the metal fixture 13. A first read head 14 and an erase head 15 are mounted on the free end of the metal fixture 16 and, further, a write head 17 is attached thereto. The distance between adjacent ones of a travel path Pa of the heads 11 and 12, a travel path Pb of the head 17 and a travel path Pc of the head 14 and 15 is D, as illustrated. The pulley 6 is coupled to the shaft of a pulse motor 4 and a cam 9 is linked with the shaft of a pulse motor 5. By driving the motor 4 in its forward and backward directions, the second read head 11, the write head 17 and the first read head 14, which are all coupled to the belt 8, are respectively driven along the travel paths Pa, Pb and Pc to reciprocate by a path length W. As for the recording medium 10, the cam 9 is held in contact with a metal fitting 20 by the action of springs 18 and 19. By the driving force of the pulse motor 5, the cam 9 is reciprocated by the distance D in a direction perpendicular to the travel path of each head. These movements and actions will be described with regard to FIGS. 7A, 7B, 7C and 8.

Figure 7A:
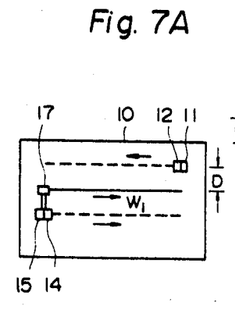
FIGS. 7A, 7B, 7C and 8 are a diagram explanatory of the signal recording and reading out operations by a write head and a read head in the embodiment shown in FIGS. 5 and 6.
Figure 7B:
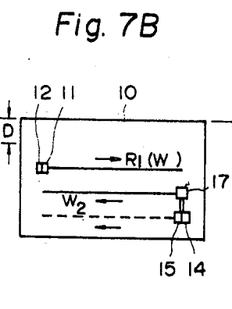
Figure 7C:
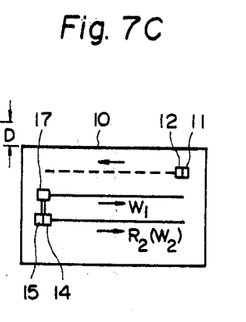
Figure 8:
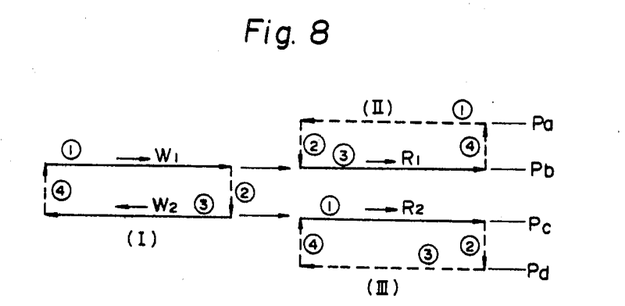

The state of FIG. 7A is an initial state, in which the write head 17 scans in the direction of the arrows $W_1$ to record a signal on the recording medium 10 and the read heads 11 and 14 and erase heads 12 and 15 move along the broken-line travel paths in the directions of the arrows. In the state of FIG. 7B, after the recording medium 10 moves up by the distance D, the write head 17 records a signal on the recording medium 10 in the direction of the arrow $W_2$ and the read head 11 scans in the direction of the arrow $R_1$ (the direction $W_1$ in which the recording head 17 has recorded the signal) to read out the recorded signal and then the erase head 12 erases the recorded signal. The state of FIG. 7C shows the state in which the recording medium 10 has moved back by the distance D, in which case the write head 17 writes a signal on the recording medium 10 in the direction of the arrow $W_1$ and the read head 14 scans in the direction of the arrow $R_1$ to read out the signal recorded in the direction $W_2$ in the state of FIG. 7B and then the erase head 15 erases the recorded signal. Thereafter, the states of FIGS. 7B and 7C are repeated alternately with each other, in which the recording head 17, the second head 11 and the first read head 14 form loci (I), (II) and (III), respectively. Namely, the writing operation by the write head 17 in the recording medium 10 is achieved by the two-way scanning, while readout of the recorded signal is carried out by the read heads 11 and 14 alternately with each other only in the one-way scanning.

Figure 9:
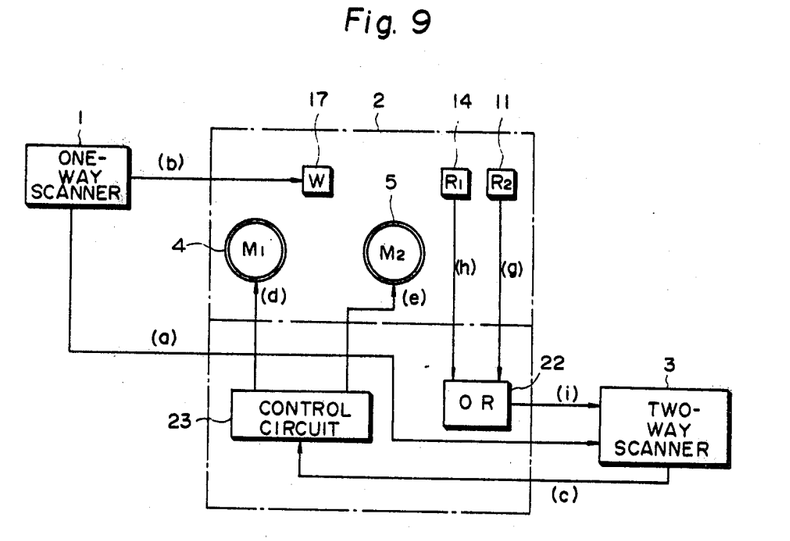
FIGS. 9 and 10 are block diagram illustrating examples of a signal transmission system in this invention.
Figure 10:
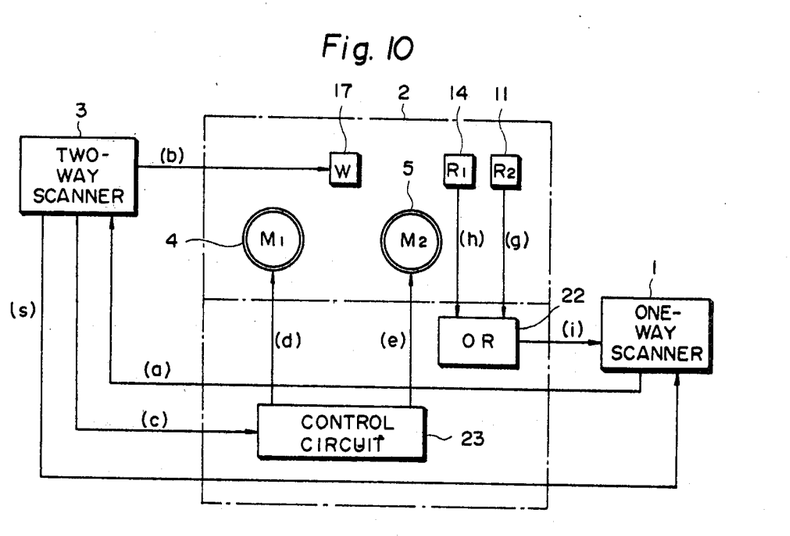

FIGS. 9 and 10 are block diagrams each showing the construction of a facsimile signal converter of this invention. FIG. 9 illustrates a signal conversion in the direction from the one-way scanner 1 to the two-way scanner 3, which will be described together with the timing chart of FIG. 11. The two-way scanner 3 is controlled by a synchronizing signal (a) provided from the one-way scanner 1 and a picture signal (b) is applied to the write head 17 and written in the recording medium 10, as described previously. From the two-way scanner 3, a control pulse signal (c) is applied to a control circuit 23, which is composed of a counter, a flip-flop, a clock pulse generator, etc. as described hereinafter with reference to FIG. 16 and, from the control circuit 23, drive pulses (d) and (e) are applied to the pulse motors 4 and 5, respectively, for driving a motor 4 in forward and backward directions and a motor 5 in one direction. The reverse drive pulses (d) for driving the reverse direction have the same polarity as the forward drive pulses (d) for driving the forward (normal) direction but are applied to a drive terminal of the motor 4 different from the terminal for the forward drive pulses (d). However, these normal and reverse drive pulses are illustrated in different polarities in FIG. 11 for ready understanding. By the drive of the pulse motor 5, the cam 9 is rotated through 90° to move the recording medium 10 by the distance D in the direction perpendicular to the travel path of each head, and the recording medium is held there during one scanning of each head, as described previously. By the drive of the pulse motor 4, each head is moved along its travel path but, only during one-way scanning, output signals (g) and (h) from the first head 14 and the second read head 11 are delivered via an OR gate 22 to the two-way scanner 3 as shown by a signal (i).

FIG. 10 shows the signal converter which is started by a start signal (s) to effect signal transmission in the direction reverse to that in FIG. 9. Also in this instance, the two-way scanner 3 is controlled by the synchronizing signal (a) from the one-way scanner 1 to apply the control pulse signal (c) to the control circuit 23, from which the driver pulses (d) and (e) are applied to the pulse motors 4 and 5 to drive them in the same manner as in the case of FIG. 9. The subsequent operations are substantially identical with those achieved in the case of FIG. 9.

Figure 12:
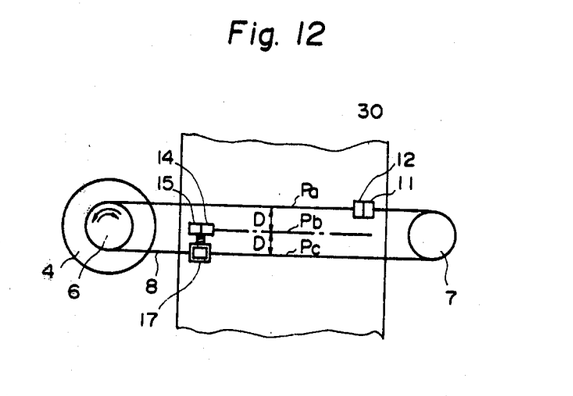
FIGS. 12 and 13 are a plan view and a side view jointly illustrating another embodiment of this invention.
Figure 13:
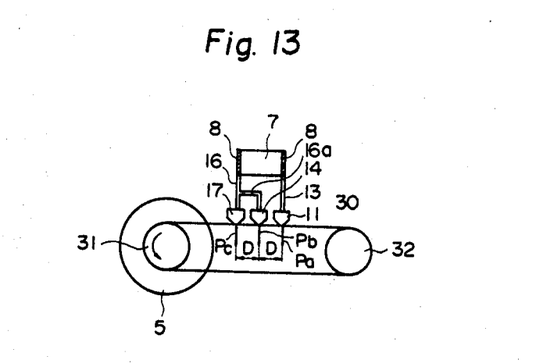

FIGS. 12 and 13 are a plan view and a side view illustrating another embodiment of the facsimile signal converter of this invention. A magnetic recording medium 30 is a wide one such, for example, as a video tape, a magnetic sheet or the like, and carried by pulleys 31 and 32 in an endless manner. The pulley 31 is coupled to the shaft of the pulse motor 5 and feeds the recording medium 30 in one direction indicated by the arrow.

The write head 17, the first read head 14 (provided with the erase head 15) and the second read head 11 (provided with the erase head 12) are mounted on the belt 8 by means of the metal fixtures 16, 16a and 13, respectively. The second read head 11, the first read head 14 and the write head 17 reciprocate along the travel paths Pa, Pb and Pc for scanning, respectively. The travel paths of the heads are disposed at intervals of D. The second read head 11 and the erase head 12 move in the direction reverse to the first read head 14, the erase head 15 and the write head 17. The belt 8 is driven on the pulleys 6 and 7 to stretch therebetween and the pulley 6 is linked with the shaft of the pulse motor 4 to reciprocate each head for scanning with the forward and backward driving of the pulse motor 4.

Figure 14:
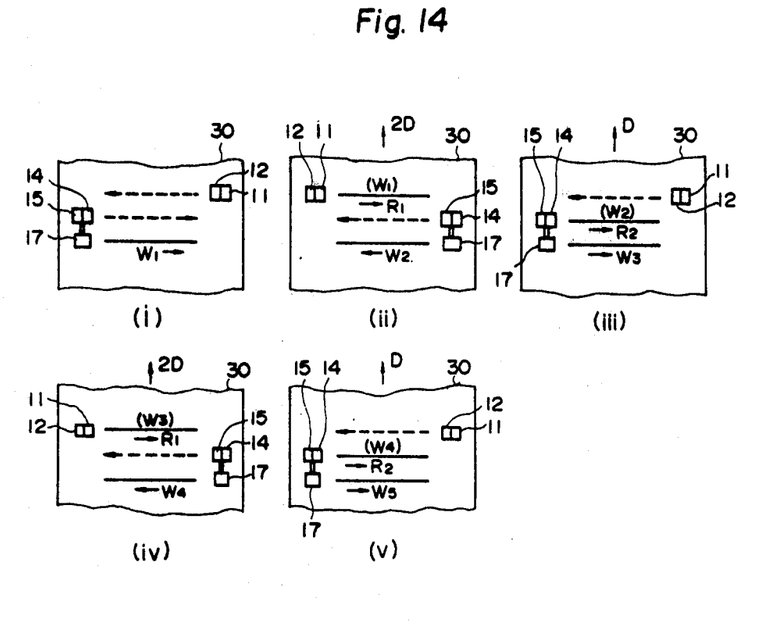
FIG. 14 is a diagram explanatory of the operation of each head and the feeding state of the recording medium in the embodiment shown in FIGS. 12 and 13.

FIG. 14 shows a series of diagrams explanatory of the operation of each head and the states of a recording medium feeding state. The state (i) shows an initial state, illustrating a record obtained by one scanning of the write head 17 from left to right. The read head 14 moves in the same direction as the write head 17 and the read head 11 moves in the reverse direction. The recording medium 30 is fed by the distance 2D to shift to a state (ii). In this state, the write head 17 moves from right to left to effect recording of one scanning ($W_2$) and, at the same time, the second read head 11 moves from left to right to read out the signal ($W_1$) recorded previously and then the recording medium 30 is fed by the distance D to provide a state (iii), in which the write head records ($W_3$) and the first read head 14 reads out the signal ($W_2$) ($R_2$). Thereafter, the same operations take place to shift to states (iv) and (v). That is, the recording medium 30 is fed by the distance D and the distance 2D alternately with each other, and the writing operation by the write head 17 in the recording medium 30 is achieved by its reciprocating scanning. The recorded signals are read out by the first read head 14 and second read head 11 alternately during their scanning from left to right. The erase heads 12 and 15 erase the signals on the recording medium 30 immediately after they are read out by the read heads 11 and 15.

Figure 15:
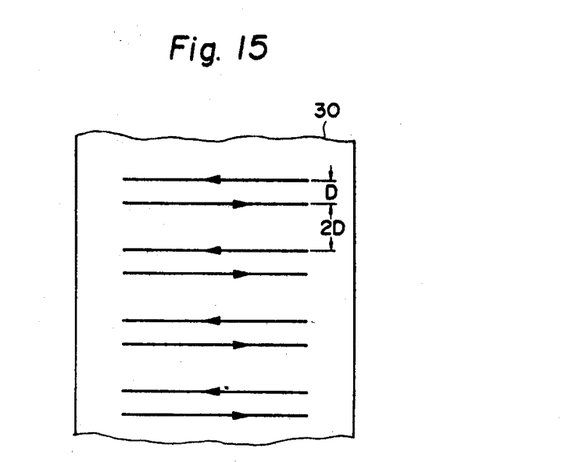
FIG. 15 is a diagram explanatory of the direction and the spacing of signals recorded on a recording medium in the embodiment shown in FIGS. 12 and 13.

FIG. 15 shows the directions in which the signals recorded on the recording medium 30 are written and the intervals at which they are written. The signal write directions alternate with each other and the spacings D and 2D also alternate with each other.

Figure 11:
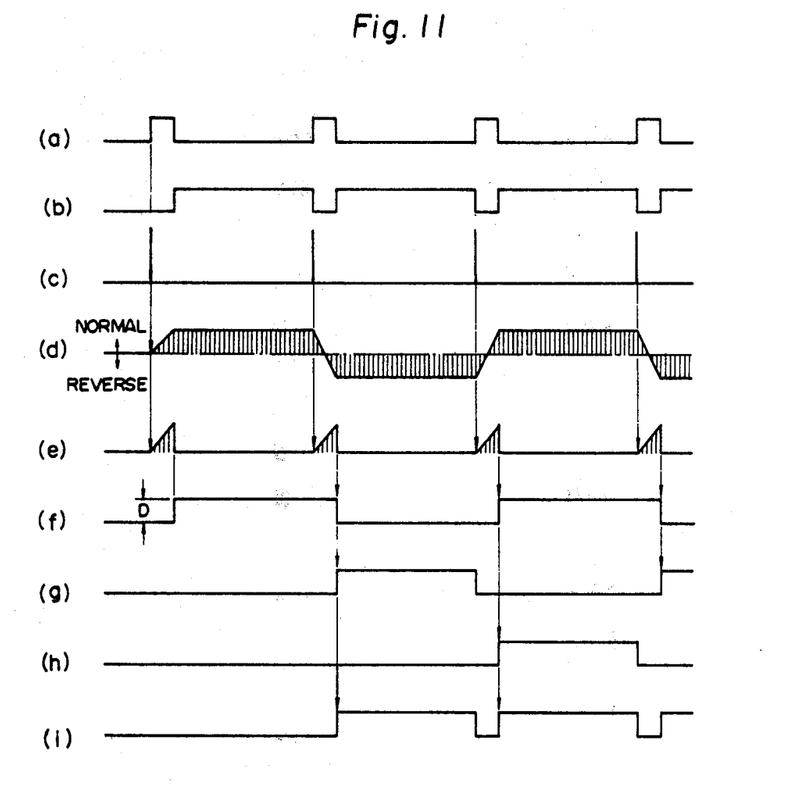
FIG. 11 shows time charts explanatory of the operations of the examples shown in FIGS. 9 and 10.
Figure 16:
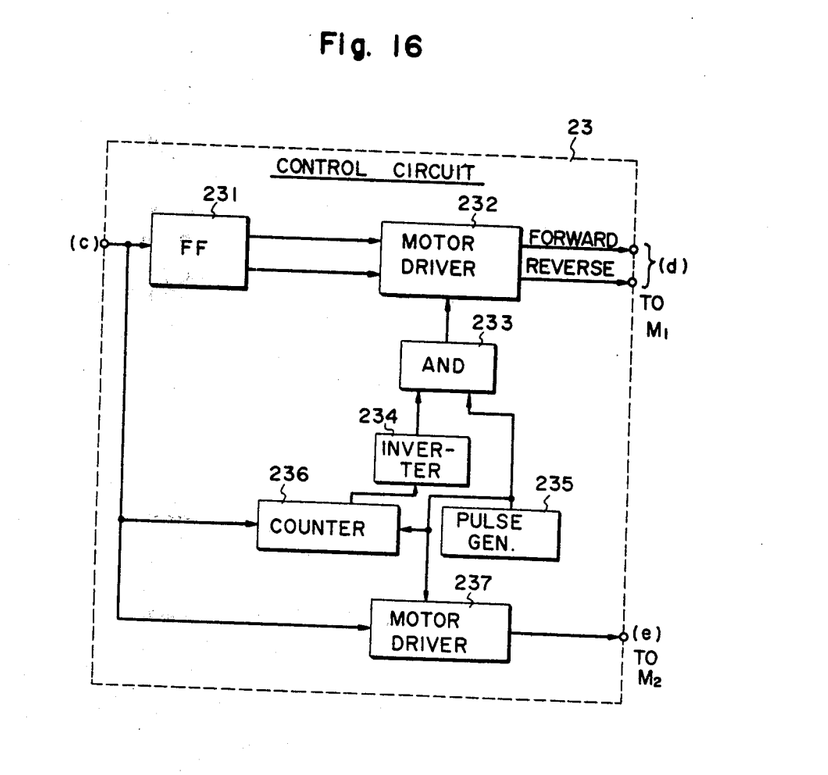
FIG. 16 is a block diagram illustrating an example of a control circuit employed in FIGS. 9 and 10.

With reference to FIG. 16, an example of the control circuit 23 employed in FIGS. 9 and 10 comprises a T flip-flop 231, motor drivers 232 and 237, and AND gate 233, an inverter 234, a pulse generator 235 and a counter 236. As shown in FIGS. 9, 10 and 11, the two-way scanner 3 is controlled by the synchronizing signal (a) from the one-way scanner 1. The two-way scanner 3 controls the T flip-flop 231, the counter 236 and the motor driven 237 by the control pulse signal (c) at the end of the one scanning of the two-way scanner 3.

In FIG. 16, the flip-flop 231 is employed for controlling the motor driver 232 to apply forward drive pulses (d) or reverse drive pulses (d) to the forward drive terminal and the reverse drive terminal of the motor $M_1$ in response to the states "1" and "0" thereof, respectively. The motor $M_1$ is driven in the forward rotation or the reverse rotation direction by the forward drive pulses (d) or the reverse drive pulses (d), respectively, the repetition frequency of which controls the driving speed of the motor $M_1$ and is determined by the drive pulses applied from the pulse generator 235 through the AND gate 233. The counter 236 is employed to determine the forward or reverse driving period of the motor $M_1$. The motor driver 237 drives the motor $M_2$ for a short duration when the motor driver 232 stops the driving of the motor $M_1$, as shown in FIG. 11, at a transition time between adjacent forward and reverse driving periods.

In FIG. 16, each pulse of the control pulse signal (c) changes the state of the T flip-flop 231 and also drives for a short duration the motor $M_2$ through the motor driver 237. The forward driving direction or the reverse driving direction is determined by the motor driver 232 in view of the state of the T flip-flop 231. In this case, each pulse of the control pulse signal (c) starts the counter 236 to count drive pulses from the pulse generates 235. Until the counter 236 generate a carry pulse, the inverter 234 generates a "1" output, so that the AND gate 233 is opened to pass the drive pulses from the pulse generator 235 to the motor driver 232 so as to generate the forward drive pulses (d) or the reverse drive pulses (d). When the counter 236 counts up the full scale thereof, the carry pulse of the counter 236 closes the AND gate 233 through the inverter 234 to stop the driving of the motor $M_1$ by the motor driver 232 by a short duration where the next one pulse of the synchronizing signal (c) is applied to the flip-flop 231, the counter 236 and the motor driver 237. Thereafter, the above operations are repeated.

Figure 17:
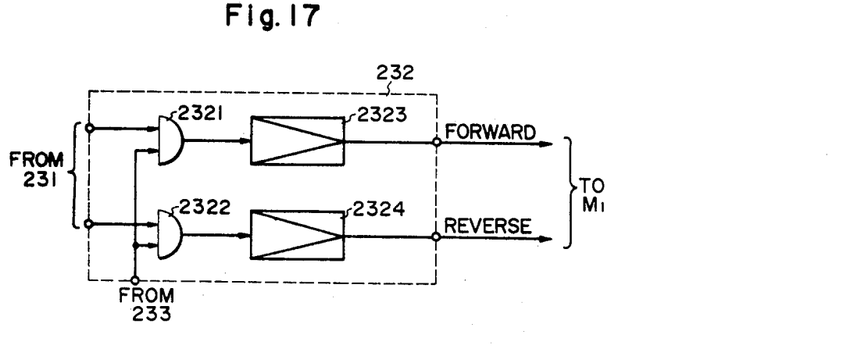
FIGS. 17 and 18 are block diagrams illustrating examples of motor drivers employed in FIG. 16.

FIG. 17 is an example of the motor driver 232, which comprises AND gates 2321, 2322 and amplifiers 2323, 2324. Output pulses from the AND gate 233 become the forward drive pulses and the reverse drive pulses in accordance with the state "1" or "0" of the flip-flop 231.

Figure 18:
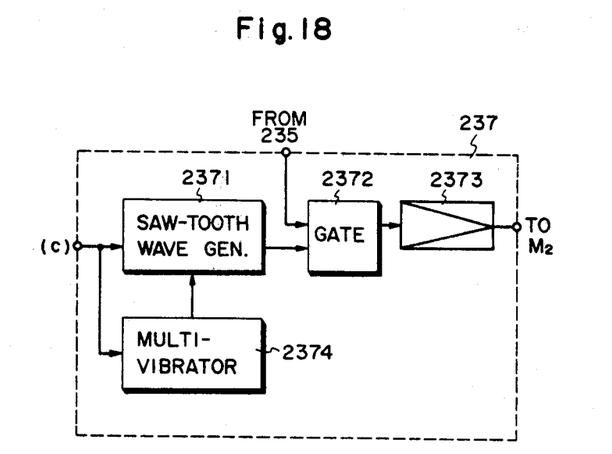

FIG. 18 is an example of the motor driver 237, which comprises a saw-tooth wave generator 2371, a gate 2372, an amplifier 2373 and a one-shot multi-vibrator 2374. Each pulse of the control pulse signal (c) starts the saw-tooth wave generator 2371 and the one-shot multi-vibrator 2374, so that the output voltage of the saw-tooth wave generator 2371 gradually rises and suddenly falls down in response to the rear end of each output pulse of the one-shot multi-vibrator 2374. Impulsive saw-tooth waves synchronized with each pulse of the control pulse signal (c) are applied from the saw-tooth wave generator 2371 to the gate terminal of the gate 2372 to gate impulses from the pulse generator 235 by the impulsive saw-tooth waves, so that the drive pulses (e) shown in FIG. 11 are obtained from the amplifier 2373.

As described in detail above, in a case of transmitting a scanning signal from a one-way scanner to a two-way scanner or from the latter to the former, mutual communication can be achieved by the employment of the facsimile signal converter of this invention. Further, it is possible, of course, to apply the invention not only to facsimile but also to data communication, printing telegraphy, etc. The device of this invention is simple in construction, reliable in operation and inexpensive, and hence is of practical value.

What we claim is:

1. A facsimile signal converter for mutually converting to each other one of a facsimile signal of one-way scanning and a facsimile signal of two-way scanning for each scanning line, comprising:
    a first drive mechanism for driving a first read head and a second read head to reciprocate for scanning in opposite directions along two spaced but parallel travel paths, respectively, and for driving a write head to move together with the first read head along a travel path developed at the midway between the two travel paths and to be positioned on the same line perpendicular to each of the two parallel travel lines;
    a second drive mechanism for driving a recording medium to shift by a certain length in a direction perpendicular to the travel paths for each scanning of the first read head and the second read head;
    means for applying an input signal to said write head for recording the input signal on the recording medium; and
    means for reading out the recorded signal by the first read head and the second read head only when the first read head and the second read head alternately scan in the corresponding one of two opposite directions.

2. A facsimile signal converter according to claim 1, in which said second drive mechanism includes means for driving said recording medium to alternately shift in the forward direction and in the backward direction.

3. A facsimile signal converter according to claim 1, in which said certain length is established to be equal to half the space between said travelling paths of said first read head and said second read head.

4. A facsimile signal converter for mutually converting to each other one of a facsimile signal of one-way scanning and a facsimile signal of two-way scanning for each scanning line, comprising:
    a first drive mechanism for driving a first read and a second read head to reciprocate for scanning in opposite directions along two spaced but parallel travel paths, respectively, and for driving a write head to move together with the first read head along a travel path developed at the midway between the two travel paths and to be positioned on the same line perpendicular to each of the two parallel travel lines;
    a second drive mechanism for driving an endless recording medium to alternately shift by a first length and a second length twice the first length in a direction perpendicular to the travel paths for each scanning of the first read head and the second read head;
    means for applying an input signal to said write head for recording the input signal on the recording medium; and means for reading out the recorded signal by the first read head and the second read head only when the first read head and the second read head alternately scan in the corresponding one of two opposite directions.

5. A facsimile signal converter according to claim 4, in which said second length is established to be twice said first length, and in which said first length is established to be equal to half the space between said travelling paths of said first read head and said second read head.

* * * * *